United States Patent [19]
Peube et al.

[11] Patent Number: 5,493,512
[45] Date of Patent: Feb. 20, 1996

[54] METHOD AND APPARATUS FOR MEASURING UNSTEADY FLOW VELOCITY

[75] Inventors: Jean-Laurent Peube, Naintre; Denis Amiot, Tessy sur Vire, both of France

[73] Assignee: Centre National De La Recherche Scientifique (CNRS), Paris, France

[21] Appl. No.: 823,282

[22] Filed: Jan. 21, 1992

[30] Foreign Application Priority Data

Jan. 22, 1991 [FR] France .................... 91 00691

[51] Int. Cl.$^6$ .................................. G06F 17/00
[52] U.S. Cl. ......................................... 364/510
[58] Field of Search ........................ 364/510, 309, 364/578; 73/199, 198, 182, 861.02, 861.03, 861.05, 861.08

[56] References Cited

U.S. PATENT DOCUMENTS

| | | | |
|---|---|---|---|
| 3,589,185 | 6/1971 | Burgess | 73/861.05 |
| 3,650,152 | 3/1972 | White | 73/861.05 |
| 3,650,637 | 3/1972 | Amicle | 73/182 |
| 3,759,096 | 9/1973 | White | 73/861.05 |
| 3,964,306 | 6/1976 | Fletcher et al. | 73/861.03 |
| 4,028,939 | 6/1977 | Fletcher et al. | 73/861.03 |
| 4,956,997 | 9/1990 | Nakamura et al. | 73/182 |

*Primary Examiner*—Ellis B. Ramirez
*Attorney, Agent, or Firm*—Blakely, Sokoloff, Taylor & Zafman

[57] ABSTRACT

A measurement method of measuring the unsteady flow of velocity of a fluid, characterized by the fact that it comprises the following steps: i) detecting instants at which the acceleration of the fluid is zero; ii) defining a measurement of the fluid velocity at instants where the acceleration is zero; and iii) determining changes in velocity between instants of zero acceleration by numerically integrating the difference between two static pressures.

13 Claims, 4 Drawing Sheets

FIG_1

FIG_2A

FIG_2B

FIG_2C

METHOD AND APPARATUS FOR MEASURING UNSTEADY FLOW VELOCITY

The present invention relates to measuring the velocity of a fluid in unsteady flow.

Velocity measurements are essential for optimizing various industrial processes.

BACKGROUND OF THE INVENTION

Numerous methods have already been proposed for measuring the velocity of a fluid in steady and continuous flow.

By way of example, mention may be made of direct methods that make use of floats, timed photography, a laser velocity meter, or sinners, and indirect methods that make use of the measured dynamic pressure in the fluid, the measured density of the flowing fluid, or methods that make use of a hot wire or film.

For non-viscous incompressible fluids flowing in steady and continuous flow, the velocity measurement method based on measuring the kinetic pressure makes use of Bernoullo's equation in its integrated form:

$$p + \rho gz + \tfrac{1}{2}\rho U^2 = \text{constant} \tag{1}$$

where:

p=the local static pressure in the fluid;

ρ=the local density of the fluid;

g=the acceleration due to gravity;

z=altitude; and

U=the modulus of the velocity.

for gases, variations in Σgz may be considered as being zero.

The impact pressure or total pressure $p_i$ may be expressed in the form:

$$p_i = p + \tfrac{1}{2}\rho U^2 \tag{2}$$

The modulus of the velocity can thus be obtained by taking the difference between the impact pressure $p_i$ and the static pressure p:

$$U = [2(p_i - p)/\rho]^{1/2} \tag{3}$$

However, unsteady flows make velocity measurement operations particularly difficult. Various velocity measurements used for fluids in steady and continuous flow are not applicable to fluids in unsteady flow.

In particular, a velocity measurement based on measuring kinetic pressure as outlined above is not usable with unsteady flows. Bernoulli's equation (1) recalled above is not applicable thereto since, as indicated below, the fluid mechanics equations for unsteady flow include, in particular, the time derivative of velocity.

Consequently, the methods commonly applied in the past for measuring the velocity of fluids in unsteady flow consists essentially in using a hot wire anemometer or a Doppler effect laser velocity meter. However, it is not easy to implement these techniques that are expensive, difficult, and sophisticated, and they are particularly ill-suited to use on an industrial site.

An object of the present invention is to eliminate the drawbacks of the prior art.

SUMMARY OF THE INVENTION

According to the present invention, this object is achieved by a method comprising the following steps:

2 i) detecting instants at which the acceleration of the fluid is zero;

ii) defining a measurement of the fluid velocity at instants where the acceleration is zero; and iii) determining changes in velocity between instants of zero acceleration by numerically integrating the difference between two static pressures.

As explained below, the measurement method of the present invention makes it possible in an industrial setting to monitor highly pulsed flow rates while combining low cost, simplicity in implementation, and reliability.

The invention also provides apparatus for implementing the above-specified method.

BRIEF DESCRIPTION OF THE DRAWINGS

Implementations of the invention are described by way of example with reference to the accompanying drawings, in which.

DETAILED DESCRIPTION

The following description begins by explaining the essential characteristics of the velocity measurement method of the present invention, prior to describing particular embodiments that implement the method.

ESSENTIAL CHARACTERISTICS OF THE INVENTION

The equations for the mechanics of fluids in unsteady flow make use of the pressure gradient and the time and space derivatives of the velocity:

$$\frac{\partial \vec{V}}{\partial t} + \vec{V} \cdot \overrightarrow{\text{grad}}\, \vec{V} = -\frac{1}{\rho} \overrightarrow{\text{grad}}\, p \tag{4}$$

By integrating equation (4) in space, it can be seen that the pressure can be expressed as a volume integral of velocity and of its derivative relative to time.

The inventors have thus determined that it is possible to discover the instantaneous local velocity of an unsteady flow on the basis of pressure measurements by using time integration and a property of the space integral of velocity.

This integral property may be obtained by means of one of the general theorems of fluid mechanics: the theorem of momentum flow rates; the kinetic energy theorem; Bernoulli's second theorem for flows with potential; . . . .

In contrast to steady flows, the presence of the time derivative of velocity in equation (4) shows that it is not possible to obtain an instantaneous and local relationship between velocity and pressure, and that time integration is therefore necessary:

On that basis, the inventors have proposed the method of the present invention which, as mentioned above, comprises the following steps:

i) detecting the instants at which the acceleration $\partial V/\partial t$ of the fluid is zero;

ii) defining a measure of the fluid velocity at instants at which acceleration is zero; and iii) determining changes in velocity between instants of zero acceleration by digital integration of the difference between two static pressures.

GENERAL DESCRIPTION OF A FIRST EMBODIMENT

Figure 1:
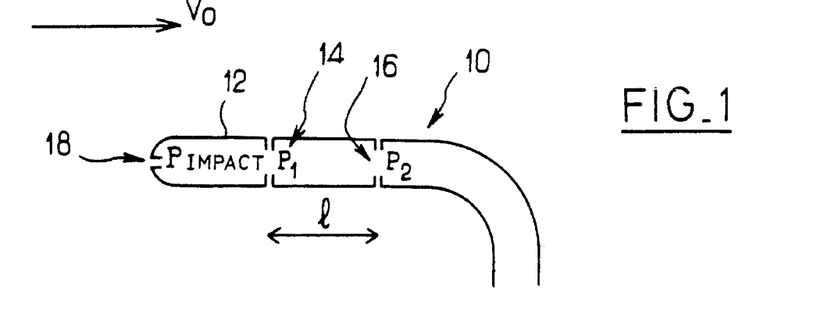
FIG. 1 is a diagrammatic view of a Pitot tube type obstacle fitted with three pressure taps in accordance with a first embodiment of the present invention.

As a first practical embodiment of apparatus for measuring unsteady velocity by means of pressure sensors, the inventors propose using an obstacle 10 as shown in accompanying FIG. 1, which obstacle is placed in a flowing fluid (the obstacle being analogous to a Pitot tube, for example) and having pressure taps 14, 16, and 18 placed thereon.

If the velocity in which the obstacle is placed is written $V_0(t)$, then pressure at a point on the obstacle satisfies a law of the form (5):

$$\partial\phi/\partial t + V^2/2 + p/\rho = \text{constant} \tag{5}$$

where $\phi$ designates the velocity potential and V the velocity at the point under consideration, these two magnitudes being proportional to the velocity $V_0(t)$ outside the obstacle, with the corresponding coefficients depending only on the position of the point on the obstacle.

By applying equation (5) at two points $M_1$ and $M_2$ at the same instant, an equation of form (6) is obtained:

$$a(dV_0/dt) + b(V_0^2/2) + (p_1 - p_2)/\rho = 0 \tag{6}$$

where a and b are two constants that can be calculated or measured in steady flow using conventional methods of fluid mechanics.

It is thus possible, in theory, to obtain $V_0(t)$ from measurements of $p_1-p_2$ by digitally integrating differential equation (6). If the pressure difference measurement $p_1-p_2$ is acquired by means of a microcomputer system, the microprocessor of the system can be programmed to perform the digital integration as the data is acquired.

However, digital integration of differential equation (6) gives rise to digital errors that can lead to an erroneous value unless the values obtained for V are regularly reset.

To this end, the inventors propose making use of the fact that equation (6) provides the velocity value $V_0(t)$ directly at moments when the acceleration $V_0'(t)$ is zero. More precisely, the corresponding instant can be observed directly from the measurement of $p_1-p_2$ so as to make it possible to calculate the velocity $V_0$ at said instant in a manner that is independent of the process of digitally integrating $V_0(t)$.

As shown in FIG. 1, this can be achieved by providing a cylindrical zone 12 in the obstacle 10 extending parallel to the velocity $V_0(t)$ of the fluid in unsteady flow, with two static pressure taps 14 and 16 being placed thereon at a spacing l, with the pressure difference therebetween being equal to $\rho l(dV_0/dt)$. Between these pressure taps, equation (6) reduces to (7):

$$(dV_0/dt) + (p_1 - p_2)/\rho l = 0 \tag{7}$$

In conventional manner, the static pressure taps 14 and 16 may be formed by small orifices through the cylindrical portion of the obstacle 10 and connected to respective pressure gauges.

The system shown in FIG. 1 preferably also includes a pressure tap 18 sensitive to the dynamic pressure at the point of impact. This impact pressure tap 18 may be formed by a small orifice through the tip of the obstacle (preferably constituted by a hemispherical cap) at the impact point and connected to a pressure gauge.

Under such circumstances, the method of the present invention essentially consists in the following steps:

i) detecting the instants at which fluid acceleration is zero by detecting that the two static pressures $p_1$ and $p_2$ measured at taps 14 and 16 are equal;

ii) defining a measure of fluid velocity at the instants when acceleration is zero on the basis of the impact pressure measured by tap 18 and the static pressure $p_1$ measured at tap 14, using the following equation:

$$V = \sqrt{2(p_{impact} - p_1)/\rho} \quad ; \text{ and} \tag{8}$$

iii) determining changes in velocity between instants at which acceleration is zero by digitally integrating above-mentioned equation (6).

For step iii), it is also possible to integrate equation (7) directly which is naturally quicker than integrating equation (6) since there is no need to calculate $V_0^2$ at each instant.

GENERAL DESCRIPTION OF A SECOND EMBODIMENT

It is advantageous to provide a pressure tap that is sensitive to the dynamic pressure at the impact point as shown in FIG. 1.

Figure 2A:
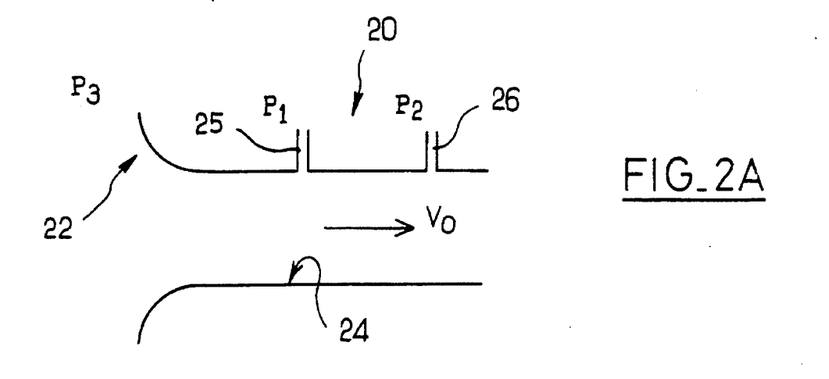
FIGS. 2A, 2B, and 2C are diagrams showing different configurations of other embodiments.
Figure 2B:
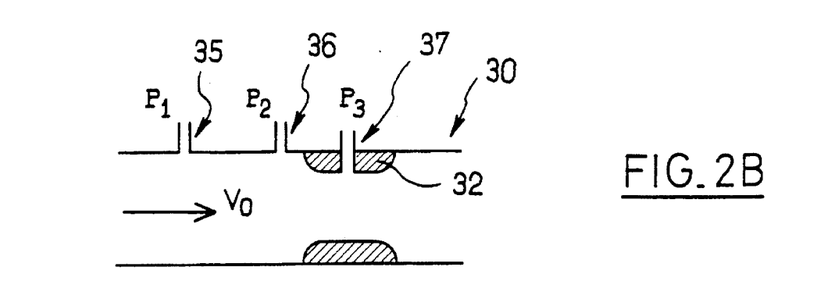
Figure 2C:
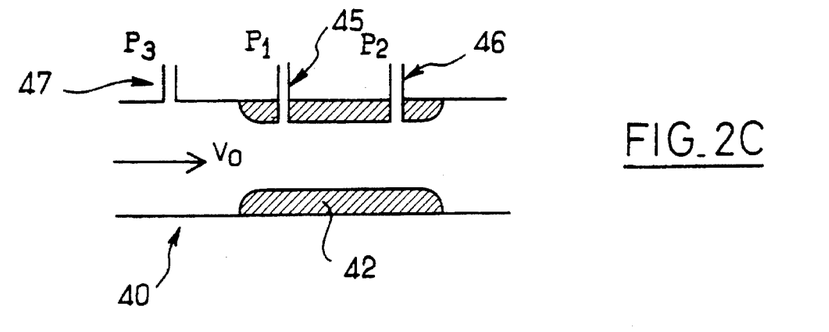

However, it is possible to proceed in other ways: for example, for an internal flow, it is possible to provoke a change in velocity by narrowing the flow section as shown in accompanying FIGS. 2A, 2B, and 2C.

FIG. 2A shows a shaped duct 20 having a convergent first portion 22 which terminates in a cylindrical second portion 24. Two static pressure taps 25 and 26 are placed on the cylindrical portion 24 to measure pressures $p_1$ and $p_2$; another pressure tap is placed on the first portion 22 to measure a pressure $P_3$.

FIG. 2B shows another duct 30 having a narrow portion 32. Two static pressure taps 35 and 36 placed on the constant section cylindrical portion 34 of the duct measure pressures $p_1$ and $p_2$. A third static pressure tap 37 placed on the narrow portion 32 measures the pressure $P_3$.

FIG. 2C shows another duct 40 having a narrow portion 42. Two static pressure taps 45 and 46 placed in the narrow portion 42 measure the pressures $p_1$ and $p_2$. A third static pressure tap 47 placed in the larger portion of the duct 40 measures the pressure $P_3$.

Using one of the systems shown in FIGS. 2A, 2B, or 2C, it is possible to measure the velocity of the fluid concerned by means of the following steps:

i) detecting the instants at which the acceleration of the fluid is zero by detecting when the two static pressures $p_1$ and $p_2$ as measured by taps 25 and 26 or 35 and 36 or 45 and 46 are equal;

ii) defining a measure of the fluid velocity at instants when acceleration is zero on the basis on the pressure difference $p_1-p_3$ measured by the corresponding taps such as 35 and 37, or 45 and 47, using the following equation:

$$V = \sqrt{2(p_1-p_3)/\rho} \quad ; \text{and} \qquad (9)$$

iii) determining changes in velocity between instants at which acceleration is zero by integrating the difference $p_1-p_2$.

Any of the geometries used in apparatuses for measuring static or total pressures in steady flows can therefore be used in the context of the method of the present invention to obtain unsteady velocities of one-dimensional pulsed flows in real time providing the steady Bernoulli theorem is applicable instantaneously at the moment when acceleration is zero. This assumes that the apparatus used does not give rise to turbulent separation, thus excluding all geometries that are not streamlined in shape (e.g. diaphragms for an internal flow).

In the embodiments described above, instants at which fluid acceleration is zero are detected by detecting that the measurements from two static pressure taps are equal. It is also possible to detect instants at which fluid acceleration is zero by calculating the current velocity.

FIRST PARTICULAR EMBODIMENT

Figures 3, 8:
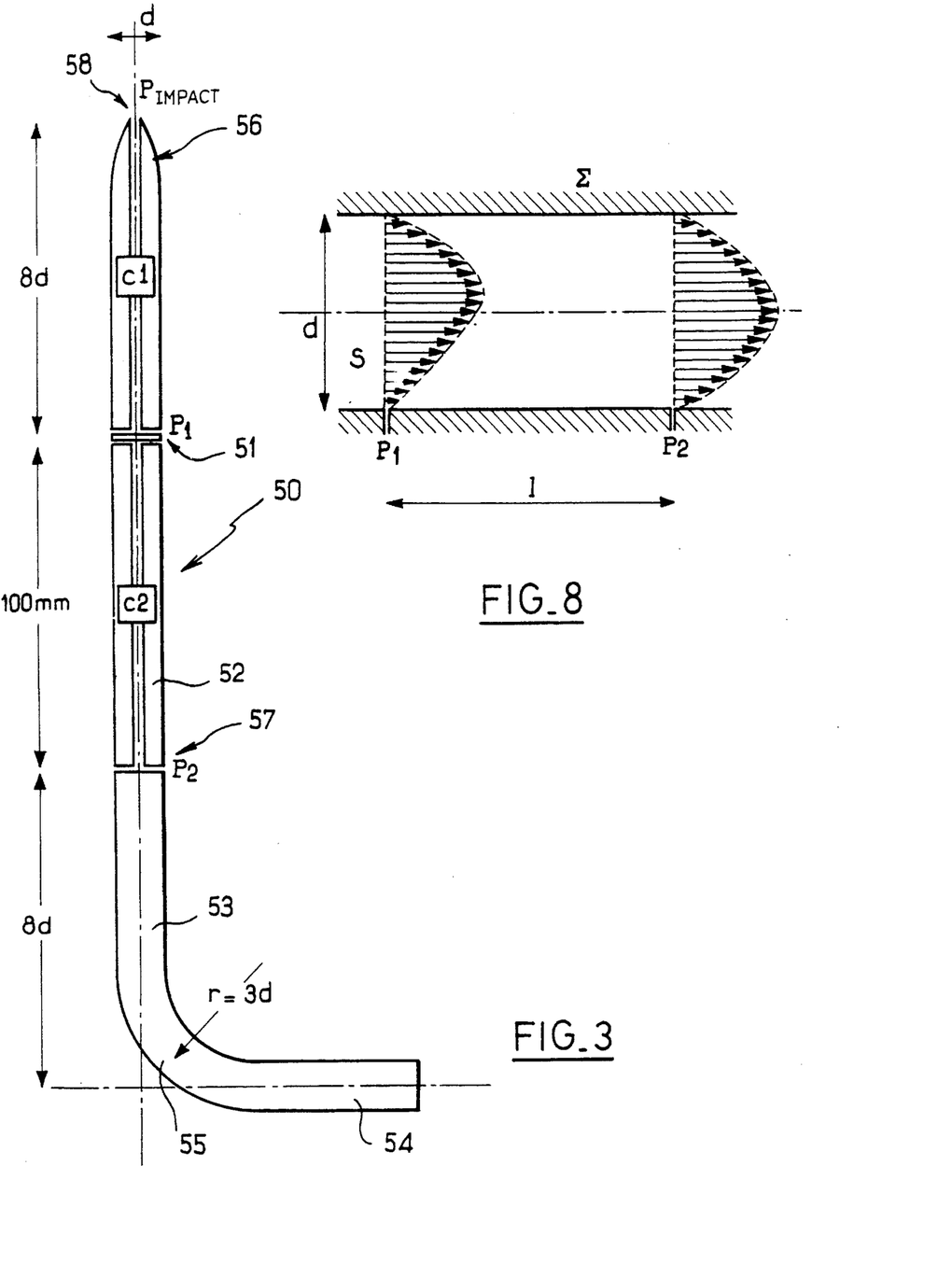
FIG. 3 is a more accurate view of a Pitot tube type obstacle fitted with three pressure taps in accordance with the first embodiment.
FIG. 8 is a diagram showing a variant embodiment.

The inventors have made a first measurement system comprising an obstacle in the form of a Pitot tube fitted with three pressure taps as shown in accompanying FIG. 3. The geometrical characteristics of this measurement system satisfy ISO standard 3966-1977 (F) for Pitot tubes. Satisfying the standard is selected by way of example.

More precisely, FIG. 3 shows an obstacle 50 similar to that of FIG. 1 comprising a cylindrical first portion 52 of constant section extending parallel to the unsteady flow and extended at its rear end 53 by a second portion 54 extending across the unsteady flow. The tip of the cylindrical first portion 52 is tapering, occupying a regular convex envelope. The cylindrical portions 52 and 54 preferably have the same diameter d.

The transition zone 55 connecting the two portions 52 and 54 is generally in the form of one-fourth of a torus having a mean radius equal to 3d. A first static pressure tap $p_1$ is provided at a distance from the tip 56 on the cylindrical portion 52. The first pressure tap 51 for the pressure $p_1$ is typically provided at a distance 8d from the tip 56.

A second static pressure tap 57 for the pressure $p_2$ is provided downstream from the first on the cylindrical portion 52. The second pressure tap 57 is typically placed at a distance of 100 mm from the first tap 51. The second tap 57 is preferably placed at a distance 8d from the axis of the second portion 54.

A third pressure tap 58 is formed axially at the leading end of the tip 56 to be sensitive to the impact pressure. A first differential pressure sensor c1 is placed between the pressure taps 51 and 58. It provides a signal representative of the pressure difference $P_{impact}-p_1$. A second differential pressure sensor c2 is placed between the pressure taps 51 and 57. It provides a signal representative of the pressure $p_1-p_2$.

Alternatively, these differential pressures could be obtained using three absolute pressure sensors responsive respectively to each of the above-mentioned pressure taps.

Pressure tap 51 for pressure $p_1$ which is connected both to sensor c1 and to sensor c2 is doubled up so that the length of the pneumatic connection going to c1 has no effect on the measurement performed by c2, and vice versa. The pressure sensors c1 and c2 are connected via preamplifiers to a microcomputer or to a small electronic interface which performs the following functions:

acquiring the pressures $(P_{impact}-p_1)$ and $(p_1-p_2)$;

calculating the flow velocity; and outputting an analog signal proportional to the velocity.

The system as described and shown in FIG. 3 uses Bernoulli's theorem (steady flow law) at instants when $(p_1-p_2)=0$ (i.e. at each extreme value of velocity):

$$(10) \quad p_1 + 1/2\rho v^2 = p_{impact} \text{ i.e. } (8) \; v = \sqrt{2(p_{impact}-p_1)/\rho}$$

This makes it possible both to engage in the process of calculating velocity and to reset the velocity at each extreme value of velocity.

On conversion to discrete terms, this calculation scheme becomes:

$$v^{n+1} = v^n + \delta t (p_1-p_2)/\rho 1 \qquad (11)$$

$$\text{when } (p_1-p_2)=0 \text{ then: } (8) \; v = \sqrt{2(p_{impact}-p_1)/\rho}$$

This particular calculation scheme has been chosen by way of example. Another method of numerical integration could be chosen to increase accuracy of calculation.

Figure 4:
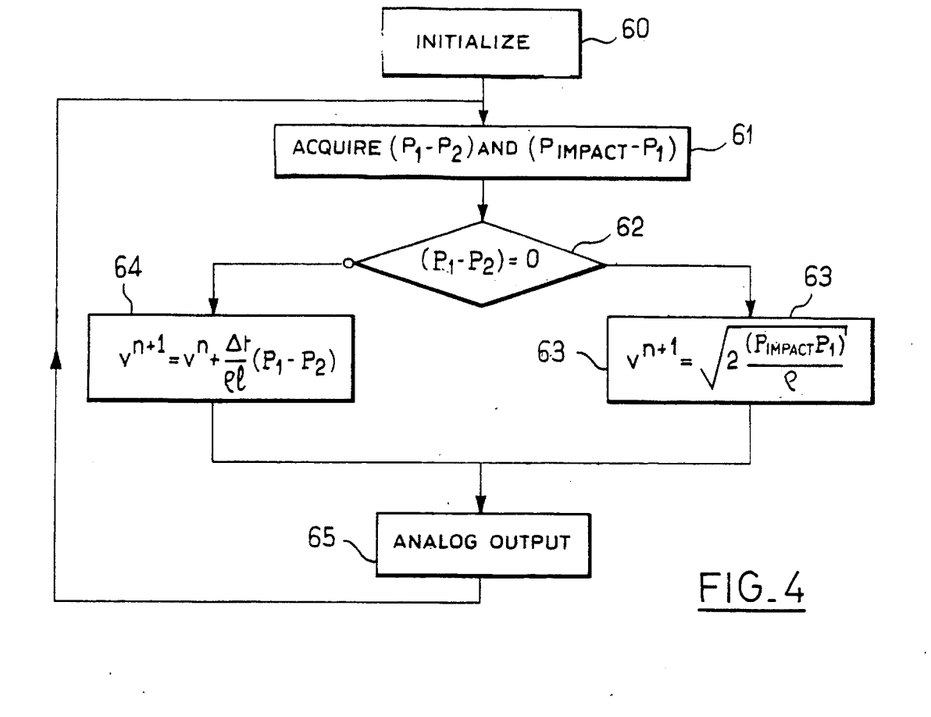
FIG. 4 is a flow chart of the measurement method implemented by said first embodiment.

The flow chart of the calculation process is shown in FIG. 4.

After an initializing stage 60, the microcomputer or the electronic interface proceeds at step 61 with acquisition of the differential pressures $p_1-p_2$ and $P_{impact}-p_1$ Step 61 is followed by a test 62 corresponding to above step i) during which the microcomputer or the electronic interface detects whether the pressures $p_1$ and $p_2$ are equal.

If they are equal, test 62 is followed by a step in which velocity calculation is initiated and in which the velocity is reset to each of its extreme values on the basis of equation (8). Step 63 corresponds to above-mentioned step ii).

When test 62 gives a negative result, it is followed by an integration step 64 on the basis of equation (8). Step 64 corresponds to above-mentioned step iii). The velocity is expressed during step 65.

The speed of modern computer systems (PC-type microcomputers) makes it possible to perform such calculations in real time. During a time interval $\delta t$ (1/5000 sec), the system acquires the pressures, calculates the corresponding velocity, and delivers an analog signal proportional to the flow of velocity.

The system shown in FIG. 3 has made it possible to measure the velocity of an unsteady flow constituting the pulsed flow in the admission of a car engine. The resulting measurement when compared with that provided by a hot wire anemometer is entirely satisfactory and has been tested for pulse frequencies of up to 80 Hz. The very high modulation rate of the flow does not appear to be a limitation.

Figure 5:
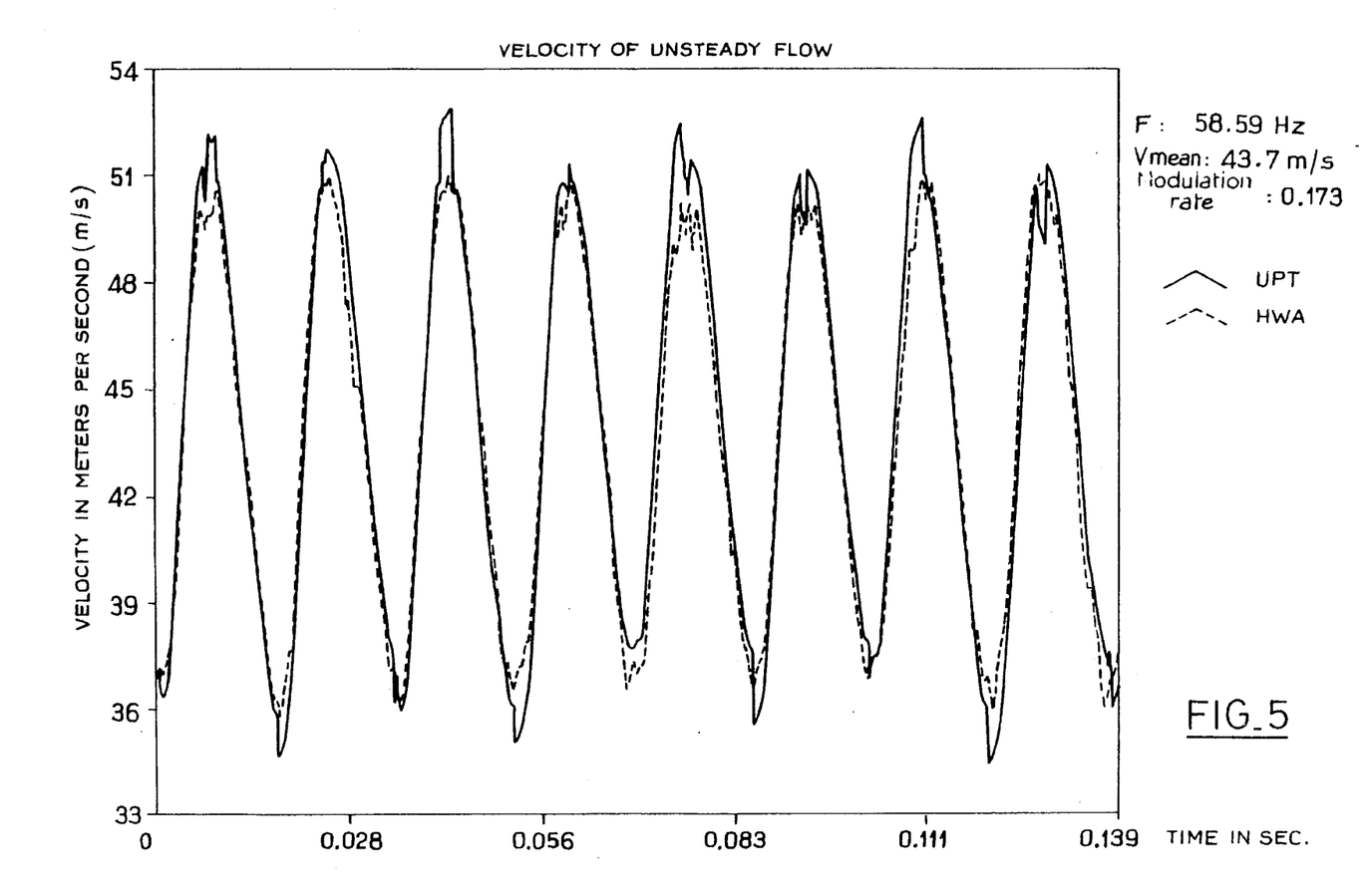
FIG. 5 is a graph showing the measurement results obtained using the first embodiment.

The results obtained are shown in FIG. 5 where the solid line referenced UPT (for Unsteady Pitot Tube) is the measurement curved obtained using the system of the present invention, and dashed line referenced HWA shows the measurement curve obtained using a conventional hot wire anemometer method.

The mean velocity error on the curve shown is 1.75%.

The mean underestimate of the flow rate on the curve shown is 0.5%.

SECOND PARTICULAR EMBODIMENT

The inventors have made a second system in which only two static pressure taps are available placed on a plane wall extending parallel to a single velocity.

In general terms, such circumstances may occur when a cylindrical portion in which the flow is parallel is not available, or else when the portion is too short to give a pressure difference $p_1-p_2$ that can be measured with sufficient accuracy. Under such circumstances, zero acceleration is detected by calculating the velocity and not by comparing two static pressures.

Figure 6:
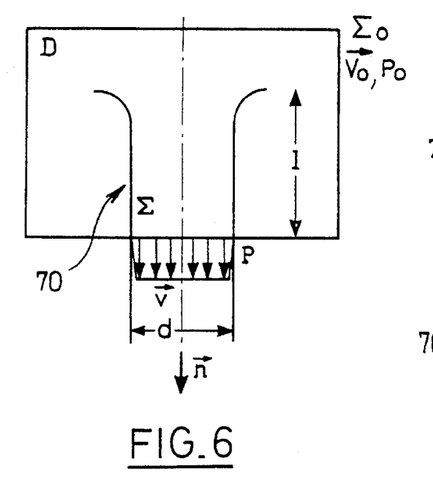
FIGS. 6 and 7 are diagrams showing another embodiment of the present invention.

In this second particular embodiment, the inventors also propose using the kinetic energy theorem:

$$\int_D (\partial/\partial t)(1/2\rho v^2)dv + \qquad (12)$$

$$\int_\Sigma (p + \rho gz + 1/2\rho v^2)u_j n_j d\sigma = P_{v\sigma} - P_{vD} \qquad$$

where $P_{v\sigma}$ and $P_{vD}$ are respectively the power provided by velocity over $\tau$, and the power dissipated by friction in D which may be assumed to be zero (see FIG. 6).

A flow entering a profiled duct 70 and a domain D, as shown in FIG. 6, may be considered where the outside boundary portion $\Sigma_0$ of the duct is in the fluid at rest and at pressure $P_0$ which is equal to atmospheric pressure.

The static pressure measured by one of the static pressure taps 73 in the wall 71 of the duct 70 and extending parallel to the flow is written p and it is assumed that the inlet 72 of the duct is sufficiently streamlined for there to be little headloss. Under such circumstances the following equation is obtained:

$$a\rho l(\partial v/\partial t)=(p-p_0)+½\rho v^2 \qquad (13)$$

where:

$$a = \int_D V_+^2 dv_+ \qquad (14)$$

is a coefficient characteristic of the distribution of velocities calculated once and for all in the manner described below. $V_+$ is a dimensionless velocity.

Equation (13) like equation (7) requires an initial value for the velocity to be supplied and numerical integration thereof is liable to drift in time because of various errors (rounding errors, measurement errors, . . . ). As before, these problems are solved by placing a total pressure tap 74 in the flow and by applying Bernoulli's theorem when the acceleration is zero.

Solving equation (13) also requires knowledge of the coefficient a which is related to the geometry of the inlet to the duct, and which can be determined once and for all. This may be done in various different ways, e.g.:

by comparative calibration; or by directly evaluating the flow velocity of a periodic flow having a period T.

If the difference $v(n+kT)-v(n)$ is zero, then the estimated value of $\alpha$ is good. Otherwise, $\alpha$ is incremented or decremented to converge on the proper value (which is fairly close to 1).

Figure 7:
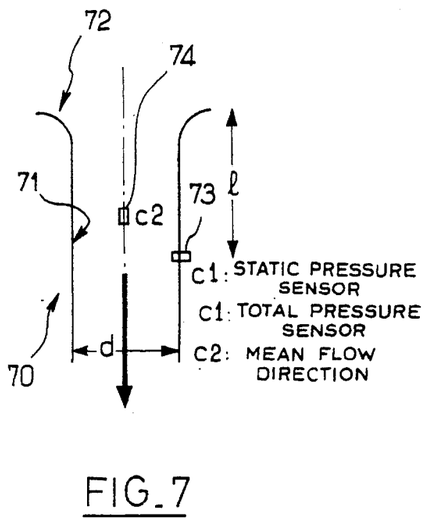

More precisely, FIG. 7 shows a streamlined duct 70 whose inlet 72 diverges. A static pressure tap 73 connected to sensor c1 placed at a distance l from the opening of the duct on the wall 71 thereof measures the static pressure p.

A second pressure tap 74 connected to a sensor c2 is placed in the middle of the duct to measure the impact pressure or total pressure $P_{impact}$.

The structure of the algorithm of the method is the same as in the above-described first embodiment.

As a result, the method of measuring velocity comprises, essentially, the following steps:

determining changes in velocity between instants of zero acceleration by integrating the equation:

$$v^{n+1}=v^n-(\delta t/\alpha\rho l)(p-p_0+½\rho(v^n)^2) \qquad (15)$$

detecting instants at which fluid acceleration is zero by monitoring the result of the preceding calculation, i.e. by monitoring for instants when:

$$v^{n+1}=v^n \qquad (16)$$

resetting the value of the speed when:

$$v^{n+1}=v^n \qquad (16)$$

using the equation:

$$v = \sqrt{2(p_{impact} - p_1)/\rho} \qquad (17)$$

A feasibility study performed on a circular tube 70 as shown in FIG. 7 with a streamlined inlet 72, the tube having a diameter of 56 mm and a length l=70 mm (length between the outside atmosphere and the pressure sensor 73) at the upstream end of the admission system of a car engine has shown that the method is capable of determining the velocity in the tube accurately.

A VARIANT EMBODIMENT MAKING USE OF THE THEOREM OF MOMENTUM FLOWS

The variant embodiment is now described using the theorem of momentum flows.

Assume, as shown diagrammatically in accompanying FIG. 8, that a flow is taking place in a cylindrical duct of diameter d (section area S), with the cylinder having two static pressure taps p1 and p2 separated by the length l. The domain D is a volume having a closed surface $\Sigma$, with $\Sigma$ being limited in length by the two sections S located at the pressure taps p1 and p2.

By applying the approximations that are conventional for flows in a duct and by applying the theorem of momentum flow to the case under consideration (projected onto the axis), the following equation is obtained:

$$\int_D \rho(\partial v/\partial t)dv + \int_\Sigma V dg_m = \Sigma F_{ext} + (p_1 - p_2)S$$

where $q_m$ is the mass flow rate and where the viscosity forces represented by the sum of the external forces are often negligible.

Under steady conditions, the equation becomes:

$$\int_D (\partial/\partial t)(\rho V)dV + 1/2lU_q^2 (\beta_1 - \beta_2)S = (p_1 - p_2)S$$

where $\beta_1$ and $\beta_2$ are coefficients characterizing the velocity profile and $U_q$ is the velocity on the axis of the duct.

By integrating the first term over the area S and then over length l, the following equation is obtained:

$$\rho l S(dU_q/dt) + \frac{1}{2}\rho U_q^2(\beta_1-\beta_2)S = (p_1-p_2)S$$

where variation in the flow rate $dU_q/dt$ is independent of the velocity distribution. If the velocity profile is established, then $\beta_1$ is equal to $\beta_2$. The flow rate can thus be found out as a function of the differential pressure $(p_1-p_2)$.

The measurement method can then be performed as follows:

i) instants are detected at which fluid acceleration is zero, i.e. instants at which the pressures detected by the sensors p1 and p2 are equal;

ii) at instants when the acceleration is zero, the fluid velocity is defined on the basis of Bernoulli's theorem as mentioned above; and iii) between instants of zero acceleration, changes in velocity are determined by numerically integrating the following equation:

$$\rho l S(dU_q/dt) = (p_1-p_2)S$$

Naturally, the present invention is not limited to the particular embodiments described above but extends to any variant coming within the spirit of the invention.

We claim:

1. Measuring apparatus for measuring the velocity of a fluid having an unsteady flow, in a duct, wherein the apparatus comprises:

a) two first pressure taps (14, 16; 25, 26; 35, 36; 45, 46; 51, 57) provided on a cylindrical portion of the duct, said two first pressure taps being spaced apart over said portion in a direction that extends parallel to the flow so that said two first pressure taps measure respective static pressures on two locations spaced apart parallely to the flow;

b) a third pressure tap (18; 37, 47, 58) provided inside the duct, in a location of said duct having a cross-section which is different than said cylindrical portion, c) means for comparing the output signals of said two first pressure taps (14, 16; 25, 26; 35, 36; 45, 46; 51, 57);

d) velocity measuring means for defining a measurement of the fluid velocity at instants when said comparing means detects that said output signals of said two first pressure taps are equal;

e) change determining means for determining changes in the velocity between instants where said output signals of said two first pressure taps are equal, by numerically integrating the difference between said two static pressures signals issued by the two first pressure taps; and f) velocity determining means for determining the fluid velocity between instants where said output signals of said two first pressure taps are equal by summing the fluid velocity measured by said velocity measuring means at instants where said output signals of said two first pressure taps are equal, and the changes of velocity determined by said change determining means.

2. Measuring apparatus according to claim 1, including a Pitot tube type obstacle fitted with said three pressure taps, said two first pressure taps being static pressure taps spaced apart over a portion of the obstacle that extends parallel to the flow and said third pressure tap being an impact pressure tap at the tip of the obstacle, said apparatus further comprising two differential pressure sensors; a first one of said sensors disposed between said impact pressure tap and one of said static pressure taps and a second one of said sensors disposed between said two static pressure taps.

3. Measuring apparatus according to claim 1, including a Pitot tube type obstacle fitted with said three pressure taps, said two first pressure taps being static pressure taps spaced apart over a portion of the obstacle that extends parallel to the flow, and said third pressure tap being an impact pressure tap at the tip of the obstacle, and three absolute pressure sensors communicating respectively with one of the pressure taps.

4. Measuring apparatus according to claim 3, wherein the velocity measuring means for defining the fluid velocity at instants when said output signals of said two first pressure taps are equal comprises the absolute pressure sensor communicating with the impact pressure tap for measuring the impact pressure $P_{impact}$, one of the absolute pressure sensor communicating with a static pressure tap for measuring a static pressure $p_1$ and means for calculating a velocity on the basis of the equation;

$$V = \sqrt{2(P_{impact}-p1)/\rho 1} \quad (8)$$

and the change determining means for determining changes in velocity comprising the two absolute pressure sensors communicating with the two static pressure taps for measuring two static pressures $p_1, p_2$ and means for monitoring changes in velocity on the basis of the following equation:

$$(dV_q/dt)+(p_1-p_2)/\rho 2\ l=0 \quad (7)$$

where $\rho$ is the density of the fluid and l is the distance between the two static pressure taps.

5. Measuring apparatus according to claim 1, wherein said duct is provided with a differential section zone; said two first pressure taps being provided at a distance apart on a constant section portion of the duct for measuring respectively the static pressure on the ends of the constant section portion, and said third pressure tap being provided on the differential section zone, the velocity measuring means for measuring the fluid velocity comprising means for calculating the fluid velocity on the basis of the following relation:

$$V=\sqrt{2(p_1-p_3)/\rho}$$

where $\rho$ is the density of the fluid and $(p_1-p_3)$ is the difference between the static pressure $p_1$ measured on an end of the constant section portion and the pressure $p_3$ on the differential section zone, and the change determining means comprise means for integrating the difference between the two static pressures measured at the ends of the constant section portion.

6. Measuring apparatus according to claim 5, wherein the third pressure tap is provided on a flared opening of the duct.

7. Measuring apparatus according to claim 5, wherein the third pressure tap is provided on a narrowing of the duct.

8. Measuring apparatus according to claim 5, wherein the constant section portion of the duct is a constant section narrowing of the duct, whereas the third pressure tap is provided away from the narrowing.

9. Measuring apparatus according to claim 2 wherein the velocity measuring means for defining the fluid velocity at instants where said output signals of said two first pressure taps are equal comprises the first differential pressure sensor provided between said impact pressure tap and one of said static pressure taps, for measuring the differential pressure ($p_{impact}-p1$) between said impact pressure and one of said static pressure and means for calculating a velocity on the basis of the equation;

$$V=\sqrt{2(P_{impact}-p1)/\rho} \tag{5}$$

the change determining means for determining changes in velocity comprises the second differential pressure sensor provided between said two static pressure taps for measuring the differential pressure (p1–p2) between said two static pressures and means for calculating changes in velocity in the basis of the following equation:

$$(dVo/dt)+(p1-p2)/\rho l=0 \tag{15}$$

where
ρ is the density of the fluid and l is the distance between the two static pressure taps.

10. Measuring apparatus for measuring the velocity of a fluid having an unsteady flow, including a streamlined duct (70), a static pressure sensor (73) on the wall of the duct, and a total pressure sensor (74), velocity measuring means which comprises means for calculating the velocity v on the basis of the following equation;

$$v=\sqrt{2(p_{arret}-p_1)/\rho} \tag{17}$$

where
ρ represents the density of the fluid;
$p_1$ represents the static pressure measured by the static pressure sensor (73) and
$P_{arret}$ represents the total pressure measured by the total pressure sensor (74) means for determining the changes in the velocity by numerically integrating the equation $$adVo/dt+bVo^2/2+(p_1-p_{arret})\rho=0.$$

11. Measuring apparatus according to claim 10, including a Pitot tube type obstacle fitted with said total pressure sensor at the tip of the obstacle.

12. Measuring apparatus according to claim 10, wherein said total pressure sensor is provided on a flared opening of the duct.

13. Measuring apparatus according to claim 10, wherein said total pressure sensor is provided on a narrowing of the duct.

* * * * *

UNITED STATES PATENT AND TRADEMARK OFFICE
CERTIFICATE OF CORRECTION

PATENT NO. : 5,493,512
DATED : February 20, 1996
INVENTOR(S) : Peube et al.

PAGE 1 OF 2

It is certified that error appears in the above-identified patent and that said Letters Patent is hereby corrected as shown below:

In column 1 at line 14, please delete "sinners" and insert -- spinners --.

In column 1 at line 22, please delete " Bernoullo's " and insert -- Bernoulli's --.

In column 1 at line 32, please delete " for " and insert -- For --.

In column 1 at line 32, please delete " $\Sigma$ " and insert -- $\rho$ --.

In column 2 at line 50-52 (Equation 4), please delete " $\overrightarrow{grad}\,\vec{V}$ " and insert -- $\overline{grad}\,\vec{V}$ --.

In column 2 at line 50-52 (Equation 4), please delete " $\overrightarrow{grad}\,p$ " and insert -- $\overline{grad}\,p$ --.

In column 7 at line 25, please delete " ujnj " and insert -- $u_j n_j$ --.

In column 7 at line 28, please delete " $\tau$ " and insert -- $\Sigma$ --.

UNITED STATES PATENT AND TRADEMARK OFFICE
CERTIFICATE OF CORRECTION

PATENT NO. : 5,493,512
DATED : February 20, 1996
INVENTOR(S) : Peube et al.

It is certified that error appears in the above-identified patent and that said Letters Patent is hereby corrected as shown below:

In column 7 at line 58, please delete " a " and insert -- $\alpha$ --.

In column 8 at line 64, please delete " dV " and insert -- dv --.

In column 10 at line 29 (Equation 7), please delete " 92 " and insert -- $\rho$ --.

Signed and Sealed this

First Day of July, 1997

Attest:

BRUCE LEHMAN

Attesting Officer

Commissioner of Patents and Trademarks